United States Patent
Bruegl

(10) Patent No.: US 11,447,069 B2
(45) Date of Patent: Sep. 20, 2022

(54) ILLUMINATION DEVICE FOR A MOTOR VEHICLE

(71) Applicant: Bayerische Motoren Werke Aktiengesellschaft, Munich (DE)

(72) Inventor: Juergen Bruegl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/980,443

(22) Filed: May 15, 2018

(65) Prior Publication Data

US 2018/0257557 A1 Sep. 13, 2018

Related U.S. Application Data

(63) Continuation of application No. PCT/EP2016/075494, filed on Oct. 24, 2016.

(30) Foreign Application Priority Data

Nov. 16, 2015 (DE) ...................... 10 2015 222 505.4

(51) Int. Cl.
*B60Q 3/64* (2017.01)
*B60Q 3/74* (2017.01)
(Continued)

(52) U.S. Cl.
CPC ............. *B60Q 3/64* (2017.02); *B60Q 3/745* (2017.02); *F21S 43/14* (2018.01); *F21S 43/237* (2018.01);
(Continued)

(58) Field of Classification Search
CPC ........ B60Q 3/64; B60Q 3/745; B60Q 3/0041; B60Q 2500/10; F21S 43/249;
(Continued)

(56) References Cited

U.S. PATENT DOCUMENTS 5,197,792 A * 3/1993 Jiao ...................... G02B 6/0048
362/623
7,600,905 B2 * 10/2009 Geiger ................. B60Q 1/2665
362/494

(Continued)

FOREIGN PATENT DOCUMENTS

CN 104235726 A 12/2014
CN 104813098 A 7/2015
(Continued)

OTHER PUBLICATIONS

"Diffuser—Definition of Diffuser by Merriam-Webster", accessed on Jul. 30, 2021 at https://www.merriam-webster.com/dictionary/diffuser (Year: 2021).*

(Continued)

*Primary Examiner* — Erin Kryukova
(74) *Attorney, Agent, or Firm* — Crowell & Moring LLP

(57) ABSTRACT

An illumination device for a motor vehicle includes one or more LED units having one or more LEDs, and a plate-shaped diffuser having a first and second delimiting surface, between which a light-diffusing material having a specified thickness is located. A face of the diffuser, which is provided between the first and second delimiting surfaces, forms the light emission surface of the illumination device that is visible to an observer. The LED unit or LED units are arranged adjacent to the first delimiting surface and, during operation, emit light toward the first delimiting surface, which enters the diffuser via the first delimiting surface. The diffuser is designed and arranged such that at least one part of the light of the LED unit or LED units entering via the first delimiting surface is directed in the diffuser to the light outlet surface and emerges there from the illumination device.

5 Claims, 3 Drawing Sheets

(51) Int. Cl.
*F21S 43/14* (2018.01)
*F21S 43/20* (2018.01)
*F21S 43/237* (2018.01)
*F21S 43/239* (2018.01)
*F21S 43/243* (2018.01)
*F21S 43/249* (2018.01)
*B60Q 3/54* (2017.01)

(52) U.S. Cl.
CPC ........... *F21S 43/239* (2018.01); *F21S 43/243* (2018.01); *F21S 43/249* (2018.01); *F21S 43/26* (2018.01); *B60Q 3/54* (2017.02)

(58) Field of Classification Search
CPC ...... F21S 43/243; F21S 43/239; F21S 43/237; F21S 43/14; F21S 43/26; F21S 43/245; G02F 2001/133626; F21W 2104/00; F21Y 2113/00; F21Y 2113/20; F21Y 2107/50; G02B 6/0015; G02B 6/0018; F21V 7/0091; F21V 5/002
See application file for complete search history.

(56) References Cited

U.S. PATENT DOCUMENTS

| | | | |
|---|---|---|---|
| 2004/0257790 A1* | 12/2004 | Tanaka | B60Q 1/302 362/23.07 |
| 2008/0093890 A1* | 4/2008 | Mehling | B60R 11/02 296/191 |
| 2009/0219731 A1* | 9/2009 | Martin | F21S 43/243 362/509 |
| 2009/0289579 A1* | 11/2009 | Zielinski | H05B 33/086 315/294 |
| 2010/0214795 A1* | 8/2010 | Salter | B60Q 3/54 362/488 |
| 2013/0114282 A1* | 5/2013 | Williams | F21S 41/141 362/518 |
| 2013/0242588 A1 | 9/2013 | Pfeil et al. | |
| 2014/0146554 A1* | 5/2014 | Giraud | G02B 6/0001 362/511 |
| 2014/0286031 A1* | 9/2014 | Marcori | F21S 41/24 362/511 |
| 2015/0036371 A1 | 2/2015 | Ichikawa et al. | |
| 2015/0049503 A1* | 2/2015 | Paroni | F21S 43/14 362/511 |
| 2015/0092438 A1* | 4/2015 | Noguchi | G02B 6/005 362/607 |
| 2015/0338048 A1* | 11/2015 | Ahn | F21S 43/239 362/511 |
| 2015/0360605 A1 | 12/2015 | Lanser et al. | |
| 2015/0377437 A1* | 12/2015 | Austerer | H05B 33/0809 362/547 |
| 2016/0109084 A1* | 4/2016 | Potter | F21S 41/24 362/511 |
| 2016/0290588 A1* | 10/2016 | Kim | F21S 43/14 |

FOREIGN PATENT DOCUMENTS

| | | | | |
|---|---|---|---|---|
| CN | 104995452 A | 10/2015 | | |
| DE | 10 2011 016 402 A1 | 10/2012 | | |
| DE | 10 2012 005 399 A1 | 9/2013 | | |
| DE | 10 2012 109 898 A1 | 4/2014 | | |
| DE | 10 2012 107 437 A1 | 6/2014 | | |
| DE | 10 2012 112 152 A1 | 6/2014 | | |
| DE | 10 2013 007 938 A1 | 11/2014 | | |
| DE | 11 2014 000 694 T5 | 10/2015 | | |
| EP | 1992868 A1 * | 11/2008 | | B60Q 1/2607 |
| EP | 2 407 709 A2 | 1/2012 | | |
| EP | 2 607 774 A2 | 6/2013 | | |
| EP | 2 816 276 A2 | 12/2014 | | |
| EP | 2816276 A2 * | 12/2014 | | |
| JP | 2015-82443 A | 4/2015 | | |
| WO | WO-2012059852 A1 * | 5/2012 | | F21S 41/29 |

OTHER PUBLICATIONS

German Search Report issued in counterpart German Application No. 10 2015 222 505.4 dated Oct. 18, 2016 with partial English-language translation (Thirteen (13) pages).
International Search Report (PCT/ISA/210) issued in PCT Application No. PCT/EP2016/075494 dated Jan. 26, 2017 with English-language translation (Seven (7) pages).
Chinese Office Action issued in Chinese application No. 201680046951.X dated Mar. 31, 2020, with English translation (Nineteen (19) pages).

* cited by examiner

ILLUMINATION DEVICE FOR A MOTOR VEHICLE

CROSS REFERENCE TO RELATED APPLICATIONS

This application is a continuation of PCT International Application No. PCT/EP2016/075494, filed Oct. 24, 2016, which claims priority under 35 U.S.C. § 119 from German Patent Application No. 10 2015 222 505.4, filed Nov. 16, 2015, the entire disclosures of which are herein expressly incorporated by reference.

BACKGROUND AND SUMMARY OF THE INVENTION

The invention relates to an illumination device for a motor vehicle.

The prior art discloses illumination devices for motor vehicles which, by use of LED units, are able to generate different types of light distributions both in the interior of the vehicle and on the exterior thereof.

In order to achieve uniform light emission, plate-shaped diffusers made of light scattering material are often used in such illumination devices, with the light from the LED units passing through the diffuser in its thickness direction. However, care has to be taken here that a sufficient distance is maintained between the diffuser and the LED units because otherwise the individual light spots of the LED units become visible, as result of which the appearance of the generated light distribution becomes inhomogeneous. On account of the distance that is to be provided between the diffuser and LED units, which should be at at least 50% of the distance between adjacent LED units, a large amount of installation space is required for the illumination device, and so the latter cannot be used, or can only be used with great difficulty, for many applications in the motor vehicle, such as e.g. as ambient or contour lighting, on account of the cramped spatial conditions.

It is therefore an object of the invention to develop an illumination device with small dimensions for a motor vehicle.

This and other objects are achieved by an illumination device according to the invention for a motor vehicle, such as e.g. an automobile or else possibly a truck or a motorbike. It includes one or more LED units, wherein a respective LED unit has one or more LEDs. Depending on the embodiment, the LED units may by RGB LED units with a red LED, green LED and blue LED and/or RGBW LED units with a red LED, green LED, blue LED and white LED or else, optionally, white light LED units with a single white LED or single-color LED units with a single colored LED. In a preferred embodiment, APA10x or WS281x LED units and the technical developments thereof are used. However, other LEDs may optionally also be used.

Further, a plate-shaped diffuser having a first and second delimiting face is provided in the illumination device according to the invention. Between these delimiting faces there is a light-scattering material with a predetermined thickness. The first delimiting face and the second delimiting face consequently lie in the planar extent of the diffuser. Here, the term plate-shaped diffuser should be interpreted broadly; i.e., the diffuser need not necessarily comprise a planar plate but it may also have a plate that is wavy or bent as desired. Moreover, the predetermined thickness of the light scattering material along the planar extent of the diffuser need not necessarily be constant everywhere; instead, it may optionally vary as well. In a preferred variant, the predetermined thickness lies in the region between 1 mm and 5 mm.

The illumination device according to the invention is distinguished in that an end face of the diffuser which is provided between the first delimiting face and the second delimiting face forms a light emergence face of the illumination device that is visible to a user and, in particular, forms the only visible light emergence face of the illumination device. Moreover, the LED unit or LED units are arranged adjacent to the first delimiting face and, during operation, emit light in the direction of the first delimiting face. This light enters into the diffuser via the first delimiting face. The light of the LED unit or the LED units preferably radiates directly onto the first delimiting face, i.e. the light does not pass any optical components between the LED unit or the LED units and the first delimiting face. In a particularly preferred variant, the LED unit or LED units have a distance of 10 mm or less from the first delimiting face. Preferably, the LED unit or the LED units abut against the first delimiting face.

The diffuser of the illumination device according to the invention is configured and arranged in such a way that at least some of the light of the LED unit or LED units entering via the first delimiting face is guided in the diffuser to the light emergence face and it emerges from the illumination device there. The light guidance in the diffuser is effectuated here by way of reflections at the first delimiting face and the second delimiting face.

The illumination device according to the invention is advantageous in that a very compact construction of the illumination device is achieved by the light emergence being at an end face of the diffuser and, hence, in a different direction than the light entry. Consequently, the illumination device can also be installed in regions of the motor vehicle in which constricted spatial conditions are present, such as e.g. in door trim, instrument panels, center consoles and the like. Further, generation of homogeneous light distribution is achieved by the light distribution in the diffuser.

In a particularly preferred embodiment, a principal emission direction is predetermined for the LED unit or LED units, the respective LED unit emitting light symmetrically in respect of said principal emission direction. Preferably, the principal emission direction of a respective LED unit is essentially perpendicular to the first delimiting face at the location where the light of the respective LED unit enters into the first delimiting face.

In a further variant of the illumination device according to the invention, the plate-shaped diffuser has a further end face which is arranged at an end of the diffuser that is distant from the light emergence face, wherein the LED unit or LED units are arranged adjacent to the further end face. This ensures that light in the diffuser travels over a long path such that the generated light distribution at the light emergence face is particularly homogeneous.

In a further, particularly preferred variant of the illumination device according to the invention, the diffuser represents a strip and the light emergence face is a longitudinal edge of the strip, wherein the illumination device preferably comprises a plurality of LED units that are arranged next to one another in the direction of the longitudinal edge of the strip. Depending on the employed LED units, these may be positioned with different packing densities and hence with a different distance from one another along the strip. In particular, packing densities of e.g. 144-367 LED units per meter may be achieved, depending on the LED installation size, corresponding to a spacing of the LED units of approximately 7 mm and less. However, the packing densities may also be lower and may lie at, for example, 72, 60 or 30 LED units per meter.

In a particularly preferred variant of the embodiment just described above, the width of the diffuser embodied as a strip lies between 40% and 250%, in particular between 50% and 200%, of the (constant) distance between adjacent LEDs. The homogeneity of the produced light distribution increases with increasing width of the strip.

In a further configuration of the illumination device according to the invention, an optical reflector is arranged at the second delimiting face of the diffuser, at least in the region which lies opposite the LED unit or units. In this way, it is possible to keep the light losses in the diffuser low. Optionally, the optical reflector can be part of the trim of the motor vehicle. Further, the reflector may, where need be, also cover the entire second delimiting face.

Depending on the configuration, the illumination device according to the invention may be an interior lighting in the motor vehicle or an exterior lighting on the outside of the motor vehicle. Accordingly, the reflector just described above may be, for example, part of an interior trim of the motor vehicle.

In a further variant of the invention, the LED unit or LED units are arranged on a heatsink, for example a cooling element. This ensures efficient dissipation of the heat generated by the LED units, even in the case of a small installation space.

In a further variant, the illumination device according to the invention comprises a plurality of LED units which are arranged on a common printed circuit board or conductor track. In the case where a heatsink is provided, the latter may be embodied, for example, on the side of the common conductor track.

In a further variant, the illumination device according to the invention further comprises a rod-shaped light guide, for example a cylindrical light guide. Here, provision is made at one or both ends of the rod-shaped light guide for one or more light sources, e.g. LEDs, for feeding light into the rod-shaped light guide. The fed light emerges from the rod-shaped light guide along the longitudinal direction of same and the rod-shaped light guide is arranged on the diffuser in such a way that the light emerging from said rod-shaped light guide enters into the diffuser and it is guided there to the light emergence face. This variant of the invention facilitates an additional generation of light by use of a rod-shaped light guide. Many different lighting effects can be produced using such an illumination device. In particular, white light can be generated by way of the rod-shaped light guide, said white light then being superposed with suitable colored animations which are generated by the LED units adjacent to the first delimiting face.

In a preferred variant of the embodiment just described above, at least one light source, which feeds light at one end of the rod-shaped light guide, is connected to a motor vehicle data bus via an interface module, wherein, further, a processing module is situated at the location of the interface module. The processing module is electrically connected to the LED unit or units and likewise is connected to the motor vehicle data bus. As a result of this, the design of the illumination device according to the invention is greatly simplified. The motor vehicle data bus is preferably a LIN (LIN=local interconnect network) bus. Optionally, the motor vehicle data bus may also be a CAN (CAN=controller area network) bus or any other data bus.

In a further variant of the illumination device according to the invention, the LED unit or LED units each comprise an integrated circuit for actuating the LED or LEDs of the respective LED unit. Preferably, the LEDs and the integrated circuit are housed in a common housing here such that the LED units are very compact. In particular, the LED units may correspond to the aforementioned APA10x and/or WS281x types and the technical developments thereof.

In a further variant, the illumination device according to the invention comprises a plurality of LED units which are coupled to a common processing module by way of an internal data bus, wherein the processing module is configured to be coupled to a motor vehicle data bus and, in particular, to a LIN data bus in order to receive first digital control commands for operating the illumination device from the motor vehicle data bus and forward these to the internal data bus as second digital control commands. The LED units are configured to feed power from a voltage supply to their LEDs on the basis of the second digital control commands on the internal data bus by way of the integrated circuits.

In a preferred variant of the embodiment just described above, the internal data bus is an SPI (SPI=serial protocol interface) data bus. Here, the processing module can be configured in such a way that the first digital control signals are provided to the SPI bus by software SPI and/or hardware SPI. The software SPI method is known per se from the prior art and facilitates, by means of a program library, a production of an executable program on the corresponding processing module, by which each pin of the processing module can be configured as an SPI pin for connection to lines of the SPI bus. Expressed differently, conventional I/O pins are configured an SPI pins when using the software SPI. In contrast thereto, dedicated PINs of the processing module are provided for connection to the SPI bus in the case where hardware SPI is used.

Instead of an SPI data bus, a differential data bus may also be used as the internal data bus, wherein a differential data bus is distinguished by digital data being encoded by way of a voltage difference between two lines. In a variant, the APIX (APIX=automotive pixel link) bus, which is known per se, is used as a differential data bus.

In a further variant of the embodiment above, the LED units are respectively configured to supply current from the voltage supply to the LED or LEDs of the respective LED unit by way of PWM modulation. Optionally, the current from the voltage supply may also be supplied by way of setting variable current levels.

In addition to the illumination device just described above, the invention relates to a motor vehicle, in particular an automobile or else possibly a truck or a motorbike, which comprises one or more of the illumination devices according to the invention or preferred variants of these illumination devices.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
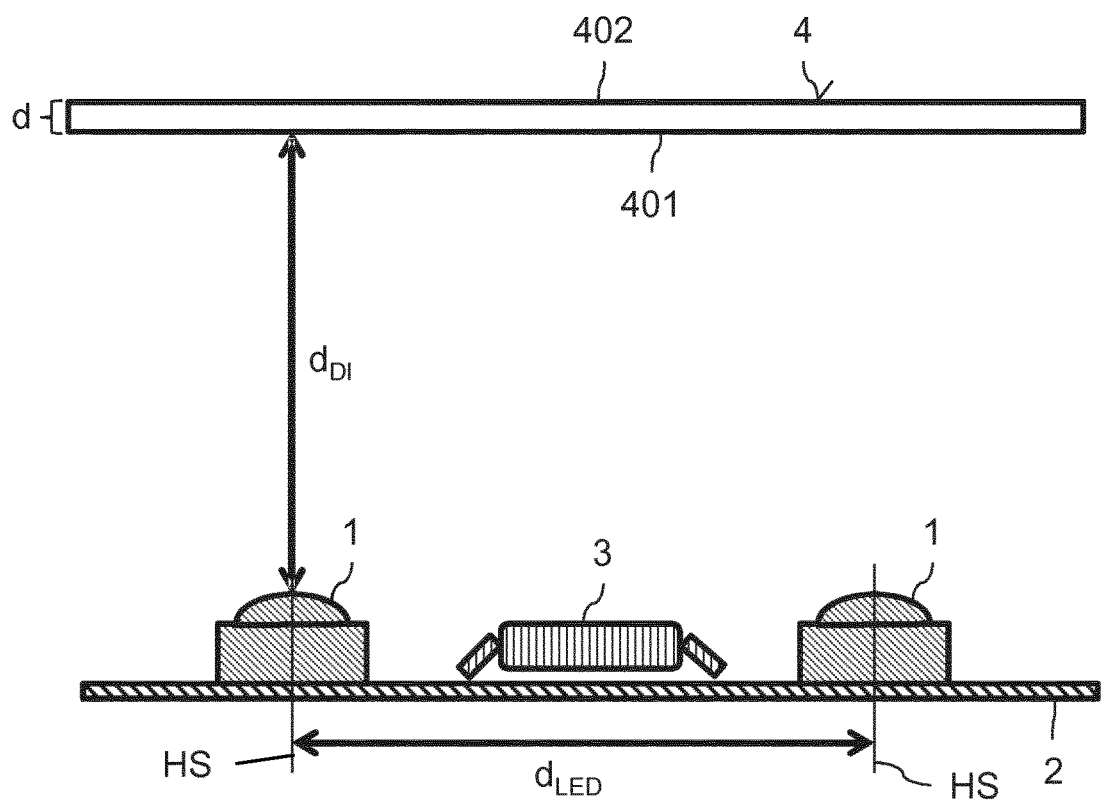
FIG. 1 is a sectional view of an illumination device according to the prior art.

FIG. 1 shows a sectional view of a motor vehicle illumination device, known per se, which, for example, may be used as interior lighting. The illumination device in FIG. 1, which is only illustrated in sections, comprises a multiplicity of LED units 1 which are arranged next to one another in a band-shaped manner on a conductor track 2 and which emit light in the upward (per the figure) direction. Here, only two LED units are shown in FIG. 1. Integrated circuits 3, which serve to actuate the individual LED units, are situated between adjacent LED units. In the embodiment of FIG. 1, the LED units are configured as RGB LEDs with a red LED, green LED and blue LED. For the conductor track with LEDs arranged thereon, use can be made, for example, of LPD-8806 type RGB strips, which are known per se. The distance $d_{LED}$ between adjacent LED units is approximately 25 mm.

Arranged in front of the LED units 1 there is a plate-shaped diffuser 4 which scatters the light from the LED units. The thickness of the diffuser is denoted by d. Light scattering material known per se, such as opal, frosted glass or a plastic (polyamide, polycarbonate, polymethylmethacrylate and the like), can be used as a material for the diffuser. The plate-shaped diffuser 4 has a lower side 401 and an upper side 402. Here, the planar extent of the diffuser extends perpendicular to the principal beam directions HS of the LED units 1. The respective LED units radiate in a symmetric manner in relation to these principal beam directions.

In the arrangement of FIG. 1, the upper side 402 of the diffuser forms the light emergence face of the illumination device. In order to achieve homogeneous light distribution on the diffuser in this arrangement, the distance $d_{DI}$ between the lower side 401 of the diffuser 4 and the upper side of the LED units 1 should be twice the distance $d_{LED}$ between the LEDs. If use is made of an optimized doped diffuser material, this distance may be reduced to 50% of the distance $d_{LED}$, where applicable. Consequently, a sufficient distance $d_{DI}$ between the LED units and the diffuser being present needs to be ensured at all times. This, in turn, is disadvantageous in that a large installation space is required for the illumination device, said installation space often not being available in a motor vehicle. In particular, installation depths in the region of 50 mm, as may occur in the illumination device of FIG. 1, are not available in the motor vehicle interior for the purposes of ambient or contour lighting.

Figure 2:
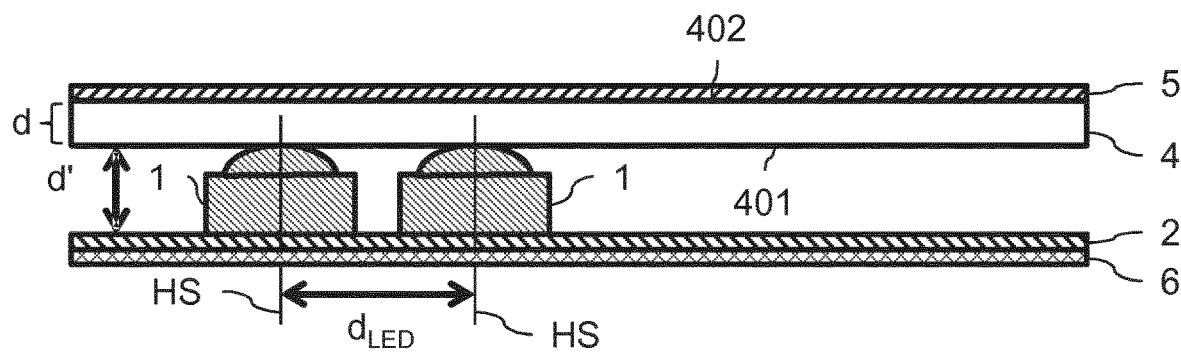
FIG. 2 is a sectional view of an embodiment of an illumination device according to the invention.

In order to solve this problem, use is made of an illumination device in which—in contrast to conventional illumination devices—the light entry into the diffuser is effectuated in a different direction than the light emergence. FIG. 2 shows a section of a variant of the illumination device according to the invention. Analogously to FIG. 1, a multiplicity of LED units 1 are arranged, once again, next to one another on a conductor track 2. In a preferred variant, use is made here of APA10x-type or WS281x-type RGB LED units or the technical developments thereof; these have a very compact design. Each of these units 1 comprises an integrated circuit for actuating the LEDs provided therein, said integrated circuit now being arranged together with the LEDs in a housing. Consequently, no integrated circuits provided outside of the LED units are present, as is the case in the prior art according to FIG. 1. Accordingly, the distance $d_{LED}$ between the individual LEDs can be significantly reduced. In the embodiment of FIG. 2, this distance lies at approximately 7 mm.

Figure 3:
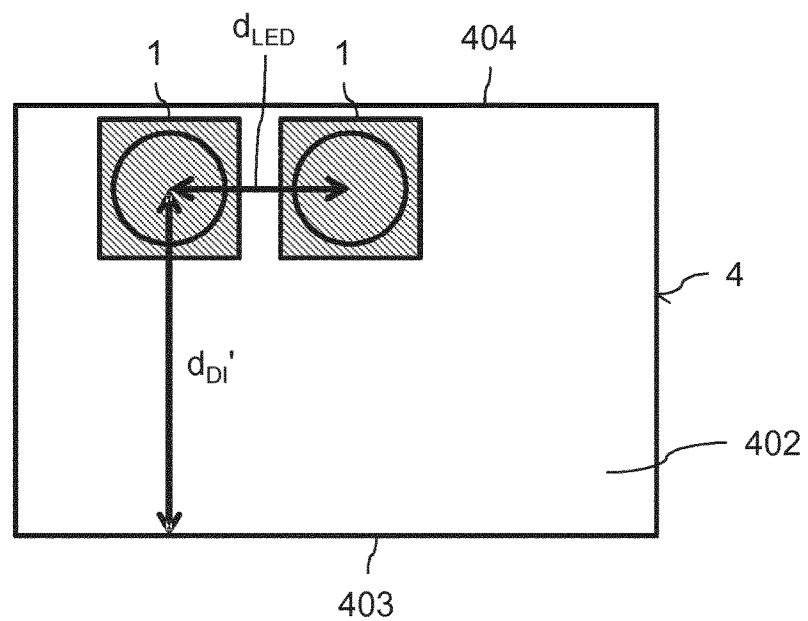
FIG. 3 is a plan view of the illumination device of FIG. 2.

In contrast to FIG. 1, the diffuser 4 abuts against the upper side of the individual LED units 1 in the embodiment of FIG. 2. The distance d' between the lower side of the diffuser 4 and the conductor track 2 is merely approximately 2.5 mm. In order once again to create a homogeneous appearance of the light emerging from the diffuser 4, the light emergence now is no longer via the upper side 402 of the diffuser but via an end side 403 of same, as indicated in FIG. 3, which is described further below. It is also clear from FIG. 2 that an optical reflector 5 is attached to the upper side of the diffuser 4; it can be omitted when necessary. The light entering into the diffuser via the lower side 401 is guided via reflections in the diffuser to the end face of the latter, with the light losses being low on account of the use of the optical reflector 5. Further, a heatsink 6 is attached under the conductor track 2 in the embodiment of FIG. 2. The heatsink ensures sufficient cooling of the individual LED units. The heatsink can be embodied as a suitable cooling element.

The dimensions of the diffuser 4 and the arrangement of the LED units 1 become clear from the plan view of FIG. 3, where the further components and, in particular, the optical reflector 5 have been omitted from this figure for reasons of clarity. Here, the illumination device of FIG. 3 is installed in the motor vehicle in such a way that the only light emergence face that is visible to the observer is the end side 403 of the plate-shaped diffuser, i.e. the light emerges from the illumination device via a gap corresponding to the thickness d of the diffuser. The individual LED units are arranged at a distance from the end side 403 on the opposite end side 404 of the diffuser 4, and so the distance $d_{DI}'$ between the LED units 1 and the light emergence face 403 becomes large. This ensures that there is a homogeneous light emergence at the end side 403 without the eye of the observer being able to resolve the individual light spots of the LED units.

In the embodiment of FIG. 3, the distance $d_{DI}'$ is approximately twice as large as the distance $d_{LED}$ between individual LED units, i.e. it is up to approximately 14 mm. Optionally, the length $d_{DI}'$ may also be selected to be less. By way of example, $d_{DI}'$ may also be 3.5 mm (i.e. half the distance between the LEDs) provided that optimized diffuser material is used. Depending on the variant, the thickness d of the plate-shaped diffuser can be selected differently and it may be, for example, between 1 mm and 5 mm. By arranging the LED units 1 immediately adjacent to the face 401 of the diffuser 4 and as a result of the light emergence via an end side 403, it is possible to significantly reduce the dimensions of the illumination device, as a result of which the use thereof is facilitated, even in the case of restricted installation space in the motor vehicle, such as e.g. in the case of an interior lighting.

The optical reflector 5 shown in FIG. 2 need not necessarily abut directly against the diffuser 4; instead, it may also be a constituent part of the motor vehicle trim, into which the diffuser is installed. The optical reflector may be embodied as a thin film, wherein different brightnesses and spectral displacements of the color points of the LED units can be achieved by using different film materials. If the optical reflector is a constituent part of the trim, the latter may be matched to various trim colors and consequently to the entire appearance of the motor vehicle.

Figure 4:
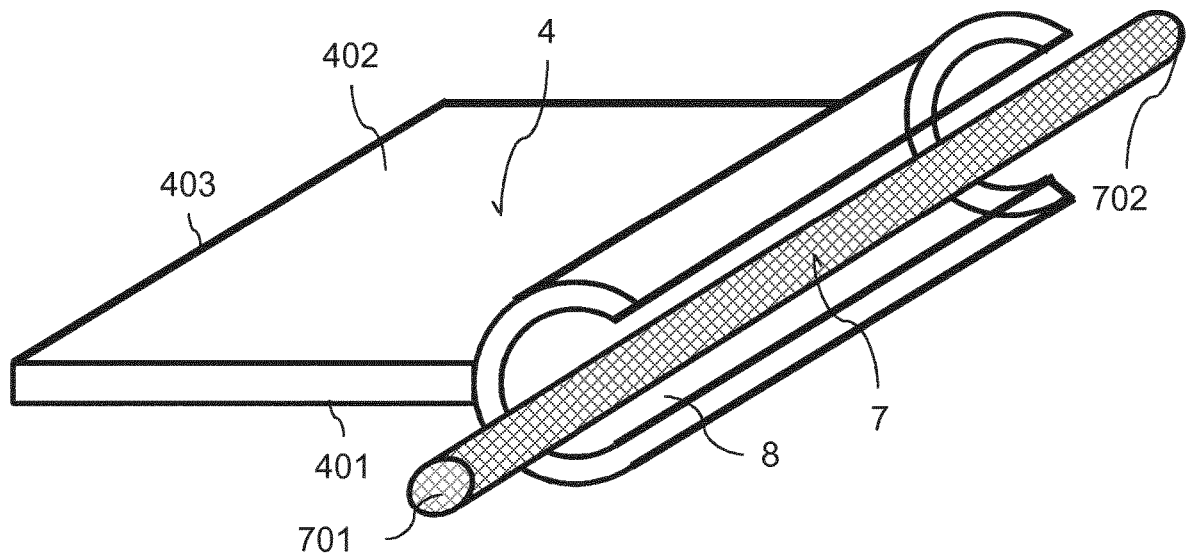
FIG. 4 is a perspective view of an illumination device according to the prior art, having a light guide feed.

FIG. 4 shows a perspective view of a motor vehicle illumination device, known per se, which comprises a cylindrical light rod 7. Here, the light from the LED (not shown) is fed into the rod via an input coupling point 701 and, optionally, via the further input coupling point 702. This leads to light guidance in the light rod 7, and so the latter emits light along its longitudinal axis. Here, the light rod is situated in a receptacle or groove 8, which in turn adjoins a plate-shaped diffuser 4. The light of the light rod, which enters the diffuser 4 from the side, is guided through the diffuser by way of reflections and finally emerges at the end side 403 of same. The end side 403 forms the only light emergence face of the illumination device.

Figure 5:
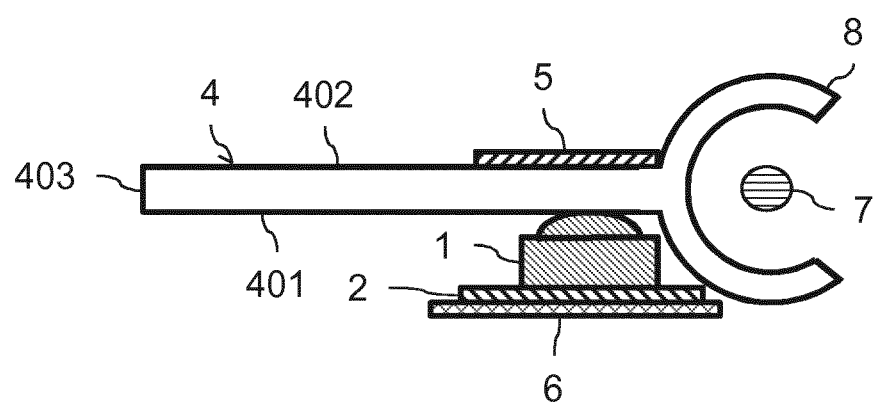
FIG. 5 is a sectional view of a further embodiment of an illumination device according to the invention, which contains the light guide feed according to FIG. 4.

The known illumination device from FIG. 4 now can be combined with the illumination device according to the invention, as becomes clear on the basis of FIG. 5. This figure shows a second variant of an illumination device according to the invention. Here, the illumination device is illustrated in a section and it comprises a multiplicity of LED units 1, analogous to the illumination device of FIG. 2. In a sectional illustration of FIG. 5, the LED units 1 are arranged in succession in a direction perpendicular to the direction of the sheet. The individual LED units once again abut directly against the lower side 401 of the diffuser 4. The light entering into the diffuser via the LED units is guided to the light emergence face 403 as in the embodiment of FIG. 2 described above. Analogously to FIG. 4, provision is made for a receptacle 8 for a rod-shaped light guide 7 which is fed with light via LEDs (not shown) at at least one input coupling point.

Once again, an optical reflector 5 is provided on the upper side 402 of the diffuser 4 in the embodiment of FIG. 5 for the purposes of reducing light losses. However, this reflector now only still extends in a region above the individual LED units 1. Further, a heatsink 6 is attached once again on the lower side of the conductor track 2 for the purposes of cooling the LED units 1. Optionally, the LED units may also be connected to one another in a discrete fashion by way of lines.

In a preferred variant of the embodiment in FIG. 5, the corresponding light source (not shown here) at the input coupling point 701 of the light rod 7 is coupled via a LIN module to a LIN bus in the motor vehicle. Preferably, a common processing module for all LED units 1 is also situated at this point, wherein this processing module is connected by an electric line to the conductor track 2 for data interchange purposes with the LED units 1 and it is further also coupled to the LIN data bus. Accordingly, the coupling to the LIN data bus may be effectuated at a single point, as a result of which a simple design of the illumination device is ensured. Here, control commands for actuating the LED units 1 and the light sources at the light rod 7 are transmitted via the LIN bus from a controller of the motor vehicle to the illumination device. In a preferred variant, the data interchange between the aforementioned processing module and the LED units is effectuated by way of an internal data bus in the form of an SPI bus, as already described above.

The embodiments of the invention described above have a number of advantages. In particular, an illumination device with a compact design for a motor vehicle is created since a corresponding diffuser may be placed directly, or at a small distance, in front of LED units. By way of the appropriate actuation of the LED units, it is further possible to produce light animations in different configurations. Optionally, a light rod may be provided as a further luminous means in the illumination device, the light likewise being guided into the diffuser by means of said light rod. Further light effects can be achieved in this way. In particular, the light rod can be used to produce a uniform light distribution, e.g. with a white color, or a base light animation, wherein, when necessary, a light animation by way of different colors can be added via appropriate actuation of the LED units, for example depending on the operation or coupled to certain events in the vehicle.

LIST OF REFERENCE SIGNS

1 LED unit
2 Conductor track
3 Integrated circuit
4 Diffuser
401 Lower side of the diffuser
402 Upper side of the diffuser
403, 404 End faces of the diffuser
5 Optical reflector
6 Heatsink
7 Light rod
701, 702 Input coupling points of the light rod
8 Receptacle
d Thickness of the diffuser
$d_{DI}$ Distance between the LED units and the lower side of the diffuser
d' Distance between the conductor track and the lower side of the diffuser
$d_{DI}'$ Distance between the LED units and the end face of the diffuser
$d_{LED}$ Distance between the LED units
HS Principal beam direction of the LED units The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An illumination device of a motor vehicle, comprising:
one or more LED units, wherein a respective LED unit comprises one or more LEDs;
a plate-shaped diffuser, wherein the plate-shaped diffuser has first and second delimiting faces and an end face, between which faces there is a light-scattering material with a predetermined thickness, wherein
the light-scattering material is disposed along an entire planar extent of the plate-shaped diffuser,
the end face of the diffuser, which is provided between the first delimiting face and the second delimiting face, forms the only light emergence face of the illumination device that is visible to a user,
the LED unit or LED units abut against the first delimiting face and, during operation, emit the light in a direction of the first delimiting face, said light entering into the diffuser via the first delimiting face,
the diffuser is configured and arranged such that the light of the LED unit or LED units entering via the first delimiting face emerges from the illumination device at the light emergence face,
an optical reflector is arranged at the second delimiting face of the diffuser, at least in a region which lies opposite the LED unit or LED units, wherein the optical reflector reduces light losses in the diffuser,
the diffuser has a further end face which is arranged at an end of the diffuser that is distant from the light emergence face, the LED unit or LED units are arranged adjacent to the further end face, and a rod-shaped light guide is disposed in a receptacle, wherein the receptacle adjoins the diffuser at the further end face of the diffuser.

2. The illumination device as claimed in claim 1, wherein the diffuser is configured as a strip and the light emergence face is a longitudinal edge of the strip, and the one or more LED units is a plurality of LED units that are arranged next to one another in a direction of the longitudinal edge of the strip.

3. The illumination device as claimed in claim 2, wherein a width of the strip lies between 40% and 250% of a distance between adjacent LED units of the plurality of LED units.

4. The illumination device as claimed in claim 2, wherein a width of the strip lies between 50% and 200% of a distance between adjacent LED units of the plurality of LED units.

5. The illumination device as claimed in claim 1, wherein the LED unit or LED units are arranged on a heatsink.

\* \* \* \* \*